(12) United States Patent
Zhao et al.

(10) Patent No.: US 10,914,999 B2
(45) Date of Patent: Feb. 9, 2021

(54) LENS, METHOD FOR FABRICATING THE SAME, GLASSES AND OPTICAL SYSTEM

(71) Applicant: BOE TECHNOLOGY GROUP CO., LTD., Beijing (CN)

(72) Inventors: Weili Zhao, Beijing (CN); Qian Wang, Beijing (CN); Wenqing Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 89 days.

(21) Appl. No.: 16/183,494

(22) Filed: Nov. 7, 2018

(65) Prior Publication Data

US 2019/0278153 A1 Sep. 12, 2019

(30) Foreign Application Priority Data

Mar. 9, 2018 (CN) .......................... 2018 1 0195898

(51) Int. Cl.
| | | |
|---|---|---|
| *G02F 1/29* | (2006.01) | |
| *G02C 7/08* | (2006.01) | |
| *G02C 7/06* | (2006.01) | |
| *G02B 5/18* | (2006.01) | |

(52) U.S. Cl.
CPC .............. *G02F 1/29* (2013.01); *G02C 7/083* (2013.01); *G02C 2202/16* (2013.01); *G02C 2202/20* (2013.01); *G02F 2201/122* (2013.01); *G02F 2203/28* (2013.01)

(58) Field of Classification Search
None
See application file for complete search history.

(56) References Cited

U.S. PATENT DOCUMENTS

| | | | |
|---|---|---|---|
| 6,626,532 B1 * | 9/2003 | Nishioka ................. | G02C 7/083 351/41 |
| 2004/0021929 A1 * | 2/2004 | Nishioka ................. | G02C 7/083 359/319 |
| 2006/0164593 A1 | 7/2006 | Peyghambarian et al. | |
| 2007/0183293 A1 * | 8/2007 | Murata ..................... | G02F 1/29 369/112.02 |
| 2008/0055536 A1 * | 3/2008 | Shimozono ....... | G02F 1/133526 349/200 |
| 2011/0157497 A1 * | 6/2011 | Kim ..................... | H04N 13/305 349/15 |
| 2012/0300042 A1 * | 11/2012 | Yun ...................... | H04N 13/305 348/51 |
| 2013/0063691 A1 * | 3/2013 | Takama .............. | G02F 1/13394 349/143 |
| 2018/0356652 A1 * | 12/2018 | Shibuya ................ | G02C 11/10 |

FOREIGN PATENT DOCUMENTS

| | | |
|---|---|---|
| CN | 101124496 A | 2/2008 |
| CN | 102866556 A | 1/2013 |
| CN | 104102022 A | 10/2014 |

OTHER PUBLICATIONS

Chinese Office Action dated Feb. 1, 2019, from application No. 201810195898.0.

* cited by examiner

*Primary Examiner* — Edward J Glick
*Assistant Examiner* — Anthony G Quash
(74) *Attorney, Agent, or Firm* — Thomas|Horstemeyer, LLP

(57) ABSTRACT

The present disclosure relates to a lens and a method for fabricating the same. The lens includes a Fresnel liquid crystal lens and a geometric lens which are sequentially stacked.

15 Claims, 5 Drawing Sheets

LENS, METHOD FOR FABRICATING THE SAME, GLASSES AND OPTICAL SYSTEM

CROSS REFERENCE

The present application claims the priority of Chinese Patent application No. 201810195898.0, filed on Mar. 9, 2018, and the entire contents thereof are incorporated herein by reference as part of the present application.

TECHNICAL FIELD

The present disclosure relates to an optical device, in particular, to a lens, a method for fabricating the same, glasses and an optical system.

BACKGROUND

According to the optical principle, when light from a light-emitting point P is subject to a diffraction effect, the light intensity distribution received on the observation screen is a plurality of concentric rings of light and dark that are arranged alternately. In this case, the distance from the center C to the light-emitting point P is $z_1$, and the distances from the outer diameters of the rings to the P points are respectively $z_1+\lambda/2, z_1+\lambda, \ldots$. According to the reversibility principle of beam path, if a set of alternating rings of light and dark are used as the optical modulation films (referring to FIG. 1), the lens-like focusing function can be realized. This special aperture in which the odd-numbered wave zone or the even-numbered wave zone is occluded is called as a Fresnel zone plate.

In the manufacture of the Fresnel zone plate, in addition to the above-described even occlusion method, a phase compensation method can also be used. Referring to FIG. 2. specifically, the thickness of the odd zones is reduced or increased, so that the light passes through the even zones to generate a π phase difference with respect to the light passing through the odd zones. In this way, the light passing through the odd zone and the light passing through the even zone have the same phase, and they thus reinforce each other to realize the focusing function of the Fresnel lens.

SUMMARY

The present disclosure seeks to solve at least one of the technical problems in the related art to some extent.

According to a first aspect of arrangements of the present disclosure, there is provided a lens including a Fresnel liquid crystal lens and a geometric lens which are sequentially stacked.

The lens according to arrangements of the present disclosure may have the following additional technical features.

According to an arrangement of the present disclosure, the geometric lens is a plano-convex lens or a plano-concave lens.

According to an arrangement of the present disclosure, the Fresnel liquid crystal lens includes a first substrate, a first electrode, a liquid crystal layer, a second electrode and a second substrate which are stacked subsequently. The first electrode includes a plurality of first sub-electrodes spaced apart from each other and disposed on a surface of the first substrate close to the second substrate. The first electrode includes a passivation layer disposed on the surface of the first substrate close to the second substrate and covering the plurality of first sub-electrodes. The first electrode includes a plurality of second sub-electrodes spaced apart from each other and disposed on a surface of the passivation layer close to the second substrate. The plurality of first sub-electrodes and the plurality of second sub-electrodes have concentrically annular shapes, and orthogonal projections of the first sub-electrodes on the first substrate and orthogonal projections of the second sub-electrodes on the first substrate are arranged alternately.

According to an arrangement of the present disclosure, there is no gap between an orthogonal projection of one of the first sub-electrodes on the first substrate and an orthogonal projection of an adjacent second sub-electrode on the first substrate.

According to an arrangement of the present disclosure, each annular band of the Fresnel liquid crystal lens includes one to four of the first sub-electrodes and one to four of the second sub-electrodes.

According to an arrangement of the present disclosure, the geometric lens serves as the first substrate or the second substrate.

According to a second aspect of arrangements of the present disclosure, there is provided a method for fabricating a lens.

The method includes providing a Fresnel liquid crystal lens and forming a geometric lens on a surface of the Fresnel liquid crystal lens.

According to arrangements of the present disclosure, the fabrication method may further have the following additional features.

According to an arrangement of the present disclosure, providing a Fresnel liquid crystal lens includes: forming a first electrode, a liquid crystal layer, a second electrode and a second substrate on a surface of a first substrate. Forming a first electrode includes: forming, on a surface of the first substrate close to the second substrate, a plurality of first sub-electrodes that are spaced apart from each other; forming, on the surface of the first substrate close to the second substrate, a passivation layer that covers the plurality of first sub-electrodes; and forming, on a surface of the passivation layer close to the second substrate, a plurality of second sub-electrodes that are spaced apart from each other. The plurality of first sub-electrodes and the plurality of second sub-electrodes have concentrically annular shapes, and orthogonal projections of the first sub-electrodes on the first substrate and orthogonal projections of the second sub-electrodes on the first substrate are arranged alternately.

According to an arrangement of the present disclosure, the geometric lens serves as the first substrate or the second substrate.

According to a third aspect of arrangements of the present disclosure, there is provided glasses.

According to an arrangement of the present disclosure, the glasses include the lens as described above.

According to a fourth aspect of arrangements of the present disclosure, there is provided an optical system.

According to an arrangement of the present disclosure, the optical system includes the lens as described above.

Additional aspects and advantages of the present disclosure will be given in the following descriptions, or can become apparent form the following descriptions.

BRIEF DESCRIPTION OF THE DRAWINGS

The above and/or additional aspects and advantages of the present disclosure will become apparent and readily understood from the following descriptions with reference to drawings.

DETAILED DESCRIPTION

Arrangements of the present disclosure will be described in detail below. Those skilled in the art will understand that the following arrangements are provided to illustrate the present disclosure and should not to be construed as limiting the present disclosure. Unless specifically stated otherwise, if some specific technologies or conditions are not explicitly described in the following arrangements, and those skilled in the art can carry out according to commonly used techniques or conditions in the art or according to the product specifications.

Currently, most of the techniques used to compensate the phase have a relief structure that is realized by etching or film deposition on the glasses. However, the focal length of the Fresnel lens obtained by the above method is not adjustable, and since the focal length of the Fresnel lens is inversely proportional to the wavelength, the technical problem of chromatic aberration is prone to be occurred.

Therefore, the structural design for the current Fresnel lens still needs to be improved.

The inventors of the present disclosure found in the course of research that different effective refractive indices of liquid crystal can be obtained by applying different voltages to control the rotation of the liquid crystal, so that the desired phase distribution step morphology can be obtained and the focal length of the lens can be adjusted by electrical control. The above Fresnel liquid crystal lens may also be used in combination with a geometric lens to effectively improve the chromatic aberration problem.

In view of the above, an objective of the present disclosure is to provide a lens that can be electrically controlled to adjust focal length or eliminate chromatic aberration.

According to an aspect of the present disclosure, there is provided a lens. The lens of the present disclosure will be described in detail with reference to FIGS. 3 to 7.

Figure 1:
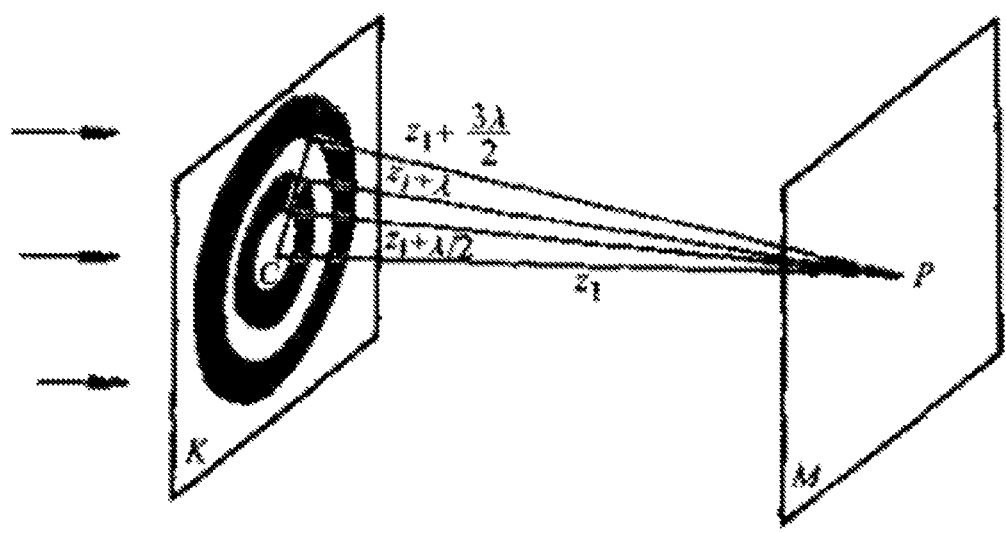
FIG. 1 is a schematic diagram illustrating the focusing principle of a Fresnel zone plate in related arts.
Figure 2:
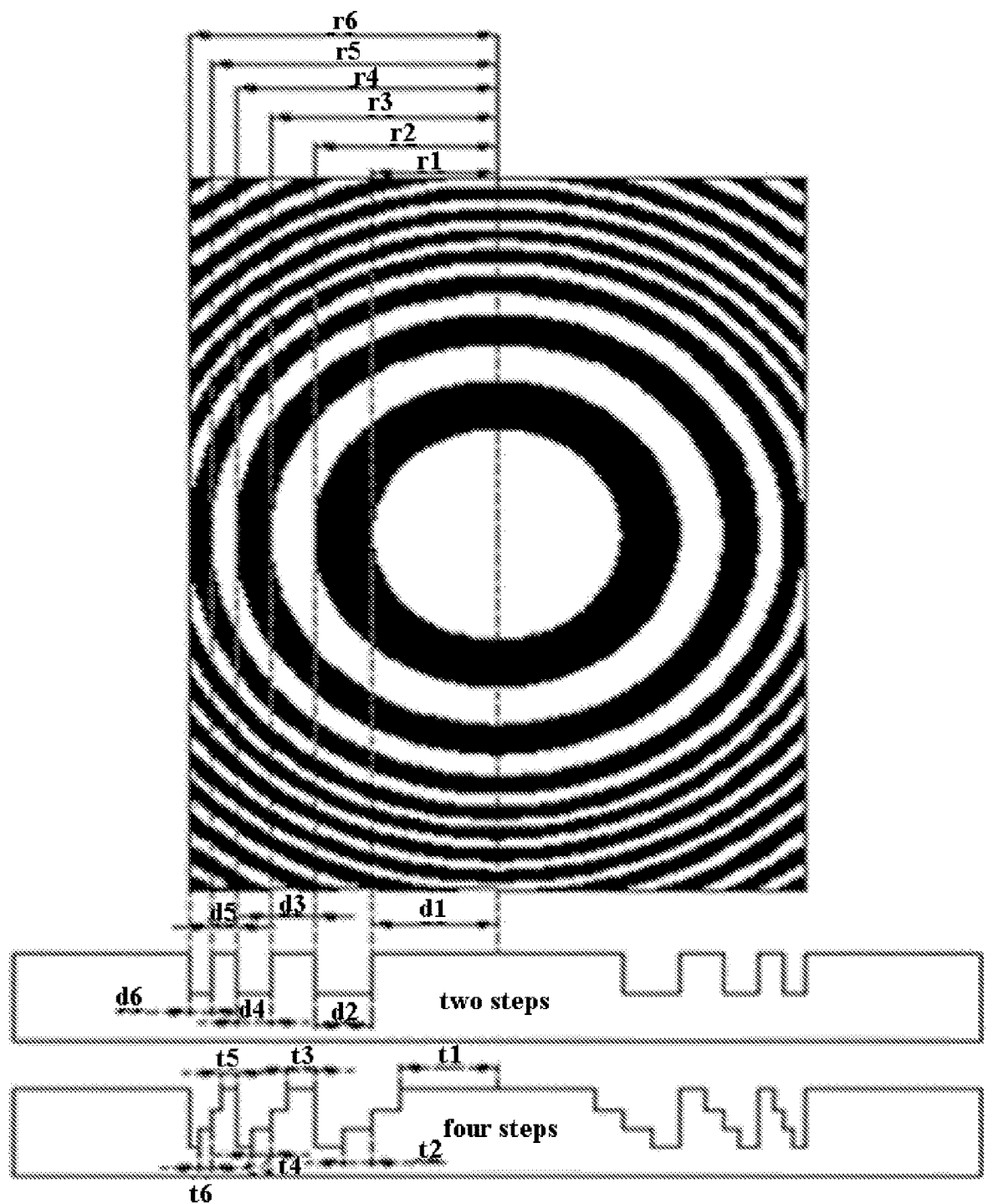
FIG. 2 is a cross-sectional view showing a step structure of a Fresnel zone plate formed by etching in related arts.
Figure 3:
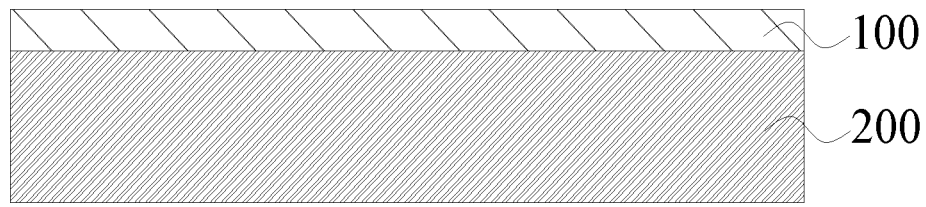
FIG. 3 is a cross-sectional view showing a lens according to an arrangement of the present disclosure.

According to an arrangement of the present disclosure, referring to FIG. 3, the lens includes a Fresnel liquid crystal lens 200 and a geometric lens 100 which are sequentially stacked, and the Fresnel liquid crystal lens 200 and the geometric lens 100 cooperate with each other to adjust the focal length of the lens. It should be noted that the term "geometric lens" herein specifically refers to an optical element which has a uniform internal structure whose surface is a spherical surface and is made of a transparent material. The geometric lens can be formed of a transparent material such as glass or resin. The term "sequentially stacked" may refer to a stacking arrangement in the direction of light.

The inventors of the present disclosure found during the research that although the Fresnel liquid crystal lens 200 can change the focal length of the lens by applying voltages to control rotation of the liquid crystal, the focal length $f_2$ of the Fresnel liquid crystal lens 200 is inversely proportional to the wavelength $\lambda$ ($f=100/D$, D is the lens power), which will make the focal length range of light of different wavelengths expand, and there is a problem of chromatic aberration. Therefore, the inventors further provide a geometric lens 100 on the surface of the Fresnel liquid crystal lens 200. Since the focal length $f_1$ of the geometric lens 100 is proportional to the wavelength $\lambda$ (the refractive index of the geometric lens material decreases as the wavelength increases), thus narrowing the focal length range of light of different wavelengths and effectively reducing the chromatic aberration.

The inventors have unexpectedly discovered that in the lens of the arrangement of the present disclosure, the Fresnel liquid crystal lens can electrically control the focal length of the lens, and the Fresnel liquid crystal lens is also used in combination with the geometric lens. The focal length of the Fresnel liquid crystal lens is in inverse proportion with the wavelength, and the focal length of the geometric lens is proportional to the wavelength, and thus the combination of the two can effectively reduce the chromatic aberration which exists in ordinary optical elements.

According to an arrangement of the present disclosure, the specific type of the geometric lens 100 is not particularly limited, and those skilled in the art can accordingly design the lens according to the specific function of the lens. In some arrangements of the present disclosure, the geometric lens 100 may be a plano-convex lens or a plano-concave lens. Accordingly, the geometric lens 100 which may be the plano-convex lens or the plano-concave lens can be directly attached to the surface of the Fresnel liquid crystal lens 200, so that the lens can have a function of zooming in or zooming out.

Figure 4:
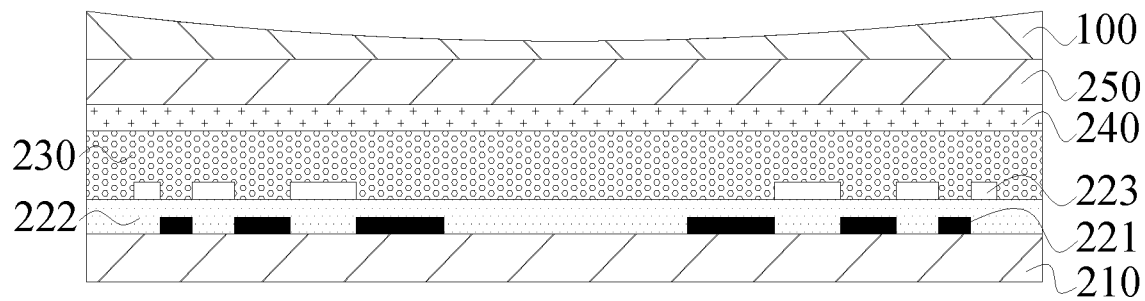
FIG. 4 is a cross-sectional view showing a lens according to an arrangement of the present disclosure.

According to an arrangement of the present disclosure, referring to FIG. 4, the Fresnel liquid crystal lens 200 includes a first substrate 210, a first electrode 220, a liquid crystal layer 230, a second electrode 240, and a second substrate 250 which are sequentially stacked. The first electrode 220 (not shown in FIG. 4) may include a plurality of first sub-electrodes 221, a passivation layer 222, and a plurality of second sub-electrodes 223.

The plurality of first sub-electrodes 221 are spaced apart from each other and are disposed on a surface of the first substrate 210 close to the second substrate 250. The passivation layer 222 is disposed on the surface of the first substrate 210 close to the second substrate 250 and covers the plurality of first sub-electrodes 221. The plurality of second sub-electrodes 223 are spaced apart from each other and are disposed on a surface of the passivation layer 222 close to the second substrate 250.

Figure 5:
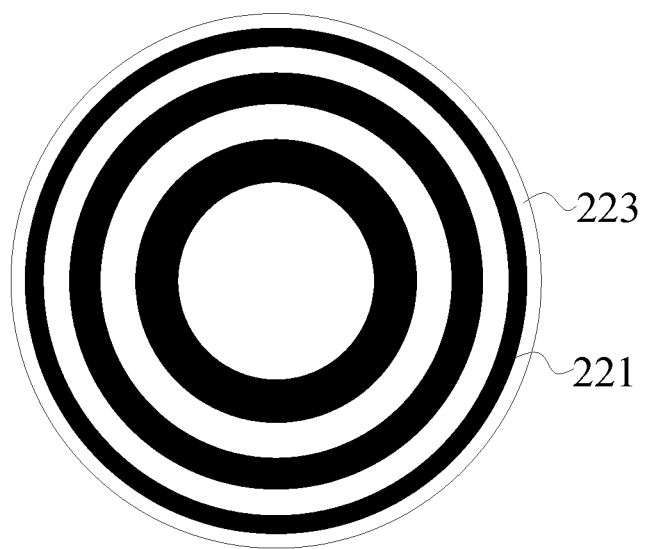
FIG. 5 is a top view showing an arrangement of first sub-electrodes and second sub-electrodes according to an arrangement of the present disclosure.

Referring to FIG. 5, the plurality of first sub-electrodes 221 and the plurality of second sub-electrodes 223 have concentrically annular shapes (in other words, the plurality of first sub-electrodes 221 and the plurality of second sub-electrodes 223 may be formed as concentric rings), and orthogonal projections of the first sub-electrodes 221 on the first substrate 210 and orthogonal projections of the second sub-electrodes 223 on the first substrate 210 are arranged alternately. In this way, by applying different driving voltages on the first electrode and the second electrode, the rotation of the liquid crystal can be adjusted to obtain different effective refractive indices of the liquid crystal, and equivalent step distribution of the optical path can be realized, that is, an equivalent Fresnel zone plate is realized. Thus, the lens power of the lens can be enhanced or reduced. Moreover, the first sub-electrodes 221 and the second sub-electrode 223 of the first electrode are staggered by the passivation layer 222 and disposed in different layers, which can effectively prevent the first sub-electrode 221 and the second sub-electrode 223 applied with different voltages from being shorted.

In some arrangements of the present disclosure, referring to FIG. 5, there is no gap between an orthogonal projection of one of the first sub-electrodes 221 on the first substrate 210 and an orthogonal projection of an adjacent second sub-electrode 223 on the first substrate 210. As such, there is no gap between the orthogonal projections of the first sub-electrodes 221 and the second sub-electrodes 223 disposed on different layers on the substrate 210. As compared with conventional technology in which the first sub-electrodes and the second sub-electrodes are disposed on the same layer and insulation regions need to be provided between the first sub-electrodes and the second sub-electrodes, the Fresnel zone plate in the present disclosure has a relatively high accuracy, and a remarkable convergence effect.

According to the arrangement of the present disclosure, the passivation layer 222 is not particularly limited to any specific insulating material, as long as the insulating material can insulate the first sub-electrodes 221 and the second sub-electrodes 223 from each other. Those skilled in the art can select proper materials according to specific driving voltages of the respective sub-electrodes, and detailed descriptions are omitted here.

According to the arrangement of the present disclosure, the specific number of the annular bands (in other words, annular zones) in the Fresnel liquid crystal lens 200 is not particularly limited, and those skilled in the art can design according to the lens power required by the Fresnel liquid crystal lens 200, and details are not described herein again. According to the arrangement of the present disclosure, the specific number of the first sub-electrodes 221 and the second sub-electrodes 223 are not particularly limited. Only three first sub-electrodes 221 and three sub-electrodes 223 are shown in FIGS. 4 and 5, and however those skilled in this art can design the number of the sub-electrodes according to the number of the annular bands in the Fresnel crystal lens 200 and details are not described herein again.

In some arrangements of the present disclosure, each of the annular bands of the Fresnel liquid crystal lens 200 may include one to four first sub-electrodes 221 and one to four second sub-electrodes 223, and thus, in each of the annular bands, the first sub-electrode 221 and the second sub-electrode 223 are respectively at different potentials, so that the combination of multi-phase steps in each annular band can be equivalently realized, and therefore the focusing effect and light efficiency of the Fresnel liquid crystal lens 200 can be better.

Figure 6:
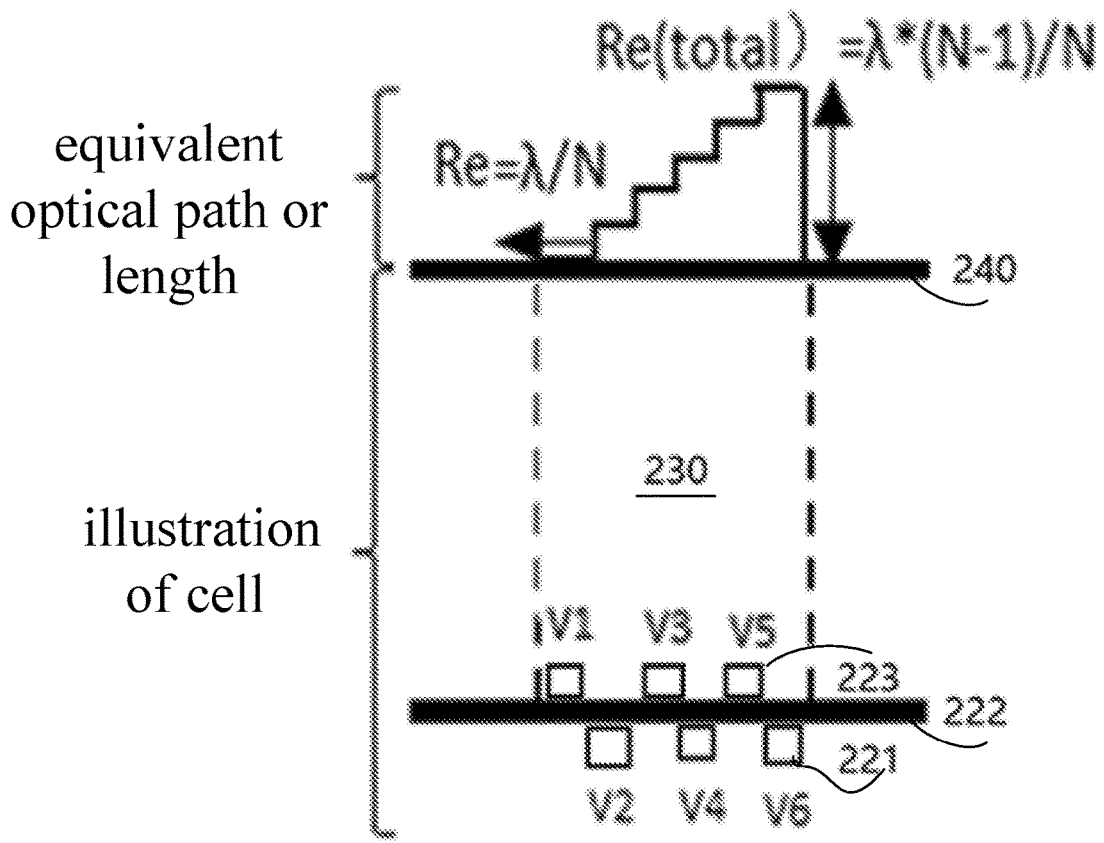
FIG. 6 is a cross-sectional view showing a six-step structure in one annular band of a Fresnel liquid crystal lens according to an arrangement of the present disclosure.

In some specific examples, each of the annular bands may include three first sub-electrodes 221 and three second sub-electrodes 223, as shown in FIG. 6. In the working state, the six sub-electrodes are respectively at different voltages of $V_1 \sim V_6$ from the inside to the outside, so that the liquid crystals at different positions rotate at different angles to obtain the refractive index distribution of $n_1 \sim n_6$. Moreover, the set of six voltages are also required to meet the following conditions: $(n_6-n_1) \cdot d = 5\lambda/6$ and $(n_{i+1}-n_i) \cdot d = \lambda/6$, where i is the i-th first sub-electrode and the second sub-electrode from the inside to the outside, n is a regulated refractive index, and $\lambda$ is the wavelength. Thus, by using the above-described driving voltages, the sixth-order multi-phase steps can be equivalently formed in each of the annular bands of the Fresnel liquid crystal lens 200, so that the Fresnel liquid crystal lens 200 has higher luminous efficiency.

According to the arrangement of the present disclosure, the specific voltage values of the respective sub-electrodes in the working state are not particularly limited, and those skilled in the art may, according to the specific liquid crystal material of the liquid crystal layer 230 and optical path difference between two adjacent sub-bands in each of the annular bands, design the voltages to be applied onto the sub-electrodes, and detailed descriptions are omitted here. According to an arrangement of the present disclosure, the specific material of the liquid crystal layer 230 is not particularly limited as long as the liquid crystal material can form different refractive indexes under different driving voltages, for example, nematic liquid crystal having a birefringence (i.e., double refraction index) $\Delta n$ of 0.1-0.5. Also, those skilled in this art can select proper liquid crystal material according to required phase difference and detailed descriptions are omitted here.

According to the arrangement of the present disclosure, the specific widths of the respective first sub-electrodes 221 and the second sub-electrodes 223 are not particularly limited, as long as the width of each sub-electrode can satisfy the convergence condition of the Fresnel lens, and the person skilled in this art can design the widths according to the specific focal length of the Fresnel liquid crystal lens 200 and the wavelength of the light wave. In some arrangements of the present disclosure, the widths of the first sub-electrode 221 and the second sub-electrode 223 may be as follows: $d_i = \sqrt{i \cdot f \cdot \lambda} - \sqrt{(i-1) \cdot f \cdot \lambda}$, where i is the i-th first sub-electrode or the i-th second sub-electrode from the inside to the outside, and $\lambda$ is the wavelength. Thus, with the sub-electrodes of the respective widths described above, the Fresnel liquid crystal lens 200 can realize a circular Fresnel zone plate under an operating state, thus further enhancing or weakening the lens power of the lens.

According to an arrangement of the present disclosure, specific materials of the first sub-electrodes 221 and the second sub-electrodes 223 are not particularly limited, as long as the sub-electrodes of the material have a conductive function and are transparent. For example, the materials of the first and second sub-electrodes may be indium tin oxide (ITO). The person skilled in the art can select the material of the first and second sub-electrodes according to the specific positions of the sub-electrodes, and details are not described herein.

According to an arrangement of the present disclosure, the Fresnel liquid crystal lens 200 may further include a signal line (or signal lines), and the signal line(s) may be disposed between the first substrate 210 and the plurality of first sub-electrodes 221, such that the signal line(s) may be coupled to the first sub-electrodes 221 directly and electrically. The signal line(s) is(are) electrically connected to the second sub-electrodes 223 through the via hole(s) on the passivation layer 222, thus electrically controlling the driving voltage of each sub-electrode. According to an arrangement of the present disclosure, the specific material of the signal line is not particularly limited, and for example, the material of the signal line may be indium tin oxide (ITO) or the like. Those skilled in the art can select the material of the signal line according to the values of the driving voltages. According to an arrangement of the present disclosure, the specific number of the signal lines is not particularly limited, and those skilled in the art can set the number of the signal lines according to the specific number of sub-electrodes in each of the annular bands, and details are not described herein again.

According to an arrangement of the present disclosure, the geometric lens 100 can be used as the first substrate 210 or the second substrate 250, so that the thickness of the lens can be made thinner and the manufacturing cost can be lower. In some arrangements of the present disclosure, referring to FIG. 7, the geometric lens 100 can serve as the second substrate. Thus, the geometric lens 100, which is a plano-concave lens, can also have a zoom-in function while acting as a second substrate.

In summary, according to an arrangement of the present disclosure, in the lens provided by arrangements of the present disclosure, the Fresnel liquid crystal lens can electrically control the focal length of the lens, and the Fresnel liquid crystal lens is also used in combination with the geometric lens. The focal length of the Fresnel liquid crystal lens is in inverse proportion with the wavelength, and the focal length of the geometric lens is proportional to the wavelength, and thus the combination of the two can effectively reduce the chromatic aberration which exists in ordinary optical elements.

Figure 8:
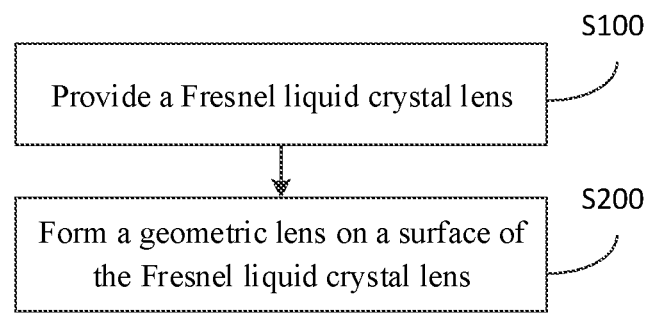
FIG. 8 is a flow chart showing a method for fabricating a lens according to an arrangement of the present disclosure.

In another aspect of the present disclosure, there is provided a method for fabricating the lens. The method for fabricating the lens will be described in detail below with reference to FIG. 8. As shown in FIG. 8, the fabrication method according to an arrangement may include S100 and S200.

In S100, a Fresnel liquid crystal lens is provided.

In this block, the fabricated Fresnel liquid crystal lens 200 is provided. According to the arrangement of the present disclosure, the specific method and blocks of fabricating the Fresnel liquid crystal lens 200 are not particularly limited, and those skilled in the art can accordingly select proper processes and blocks according to the specific structure of the Fresnel liquid crystal lens 200.

In some arrangements of the present disclosure, the block of forming the Fresnel liquid crystal lens 200 may include sequentially forming a first electrode 220, a liquid crystal layer 230, a second electrode 240, and a second substrate 250 on a surface of the first substrate 210.

Forming the first electrode may further include

On a surface of the first substrate 210 close to the second substrate 250, forming a plurality of first sub-electrodes 221 that are spaced apart from each other.

On the surface of the first substrate 210 close to the second substrate 250, forming a passivation layer 222 that covers the plurality of first sub-electrodes. On a surface of the passivation layer 222 close to the second substrate 250, a plurality of second sub-electrodes 223 that are spaced apart from each other are formed. The plurality of first sub-electrodes 221 and the plurality of second sub-electrodes 223 have concentrically annular shapes, and orthogonal projections of the first sub-electrodes 221 on the first substrate 210 and orthogonal projections of the second sub-electrodes 223 on the first substrate 210 are arranged alternately. Thus, the Fresnel liquid crystal lens 200 capable of enhancing or reducing the power of the lens can be formed by the above method.

According to an arrangement of the disclosure, there is no gap between an orthogonal projection of one of the first sub-electrodes 221 on the first substrate 210 and an orthogonal projection of an adjacent second sub-electrode 223 on the first substrate 210. Thus, the Fresnel liquid crystal lens 200 formed in this way has higher accuracy and a more remarkable convergence effect.

In S200 of FIG. 8, a geometric lens is formed on a surface of the Fresnel liquid crystal lens.

In this block, the geometric lens 100 is formed on the surface of the Fresnel liquid crystal lens 200, and the geometric lens 100 and the Fresnel liquid crystal lens 200 cooperate with each other to adjust the focal length of the lens. According to an arrangement of the present disclosure, the geometric lens 100 may be a plano-convex lens or a plano-concave lens, so that the lens can have a zoom-in or zoom-out function.

The inventors have unexpectedly discovered that by using the fabrication method of the arrangement of the present disclosure, the geometric lens can be formed on the surface of the Fresnel liquid crystal lens, thus making a lens in which the Fresnel liquid crystal lens is combined with the geometric lens, thus electrically controlling the focal length of the lens, and effectively addressing chromatic aberration.

Figure 7:
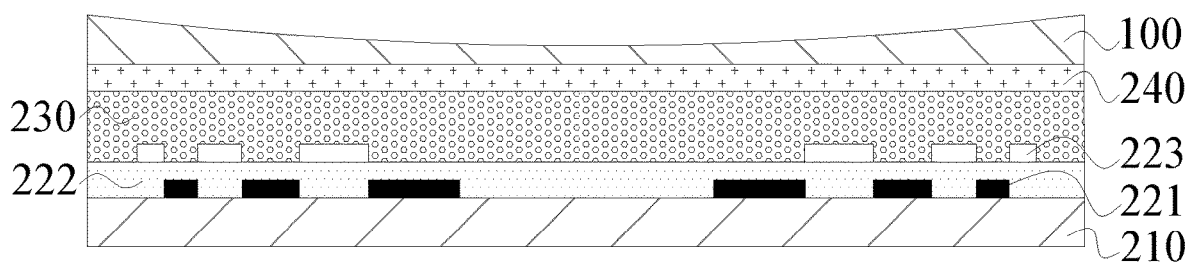
FIG. 7 is a cross-sectional view of a lens according to an arrangement of the present disclosure.

In some arrangements of the present disclosure, the geometric lens 100 can function as the first substrate 210 or the second substrate 250, such that a thinner lens can be formed and the manufacturing cost is lower. In some specific examples, the second substrate 250 may be polished to form the geometric lens 100 which has a plano-convex lens shape. An exemplary lens obtained in this block is shown in FIG. 7.

In summary, according to an arrangement of the present disclosure, the present disclosure provides a fabrication method. The geometric lens can be formed on the surface of the Fresnel liquid crystal lens, thus making a lens in which the Fresnel liquid crystal lens is combined with the geometric lens, thus electrically controlling the focal length of the lens, and effectively addressing chromatic aberration.

In another aspect of the disclosure, there is provided glasses. According to an arrangement of the present disclosure, the glasses include the lens described above.

According to an arrangement of the present disclosure, the specific type of the glasses is not particularly limited. For example, the glasses may be myopia glasses, distance glasses, reading glasses, astigmatic glasses, and smart glasses and the like. Those skilled in the art can apply the lens in the arrangements of the present disclosure to proper glasses according to the specific use of the glasses and the actual user of the glasses, and details will not be described here.

It should be noted that the glasses include other necessary components and structures in addition to the above-mentioned lens(es). Taking myopia glasses as an example, the glasses may further include the frame of the glasses, electrical lines, a control panel, and power supplies, and the like. Those skilled in this art can add additional components according to the actual use of the glasses, and details will not be described here.

In summary, according to an arrangement of the present disclosure, the present disclosure provides glasses. The focal length of the lens can be electrically controlled and adjusted, and the chromatic aberration problem is addressed, and thus the degree of the glasses is adjustable and the color is more realistic. Those skilled in the art will appreciate that the features and advantages previously described with respect to lens are applicable to the glasses and will not be repeated here.

In another aspect of the present disclosure, there is provided an optical system. According to an arrangement of the present disclosure, the optical system includes the lens described above.

According to the arrangement of the present disclosure, the specific type of the optical system is not particularly limited, and those skilled in the art can accordingly apply the lens as described above into proper optical system according to the specific use of the optical system, and details are not described herein again.

It should be noted that the optical system includes other necessary components and structures in addition to the above-mentioned lenses, and those skilled in the art can add other components accordingly according to the specific types of the optical system, and details are not described herein again.

In summary, according to an arrangement of the present disclosure, the present disclosure provides an optical system. The focal length of the lens can be electrically controlled and adjusted, and the chromatic aberration problem is addressed, and thus the magnifying power of the optical system is adjustable and the color is more realistic. Those skilled in the art will appreciate that the features and advantages previously described with respect to lens are applicable to the optical system and will not be repeated here.

In the description of the present disclosure, it is to be understood that the terms "first" and "second" are used for descriptive purposes only and are not to be construed as indicating or implying a relative importance or implicit indication of the number of the indicated technical features. Thus, features defined by "first" or "second" may include at least one of the features, either explicitly or implicitly. In the description of the present disclosure, the meaning of "a plurality" is at least two, such as two, three, etc., unless specifically defined otherwise.

In the description of the present specification, the description with reference to the terms "one arrangement", "some arrangements", "example", "specific example", or "some examples" and the like means that a specific feature, structure, material or property described in connection with the arrangements or examples may be included in at least one arrangement or example. In the present specification, the schematic representation of the above terms is not necessarily directed to the same arrangement or example. Furthermore, the particular features, structures, materials, or characteristics described may be combined in a suitable manner in any one or more arrangements or examples. In addition, various arrangements or examples described in the specification, as well as features in various arrangements or examples, may be combined.

Although the arrangements of the present disclosure have been shown and described, it is understood that the above-described arrangements are illustrative and are not to be construed as limiting the scope of the present disclosure. Those skilled in this art can make changes, modifications, substitutions or alternatives on the arrangements or examples as described above.

What is claimed is:

1. A lens, comprising a Fresnel liquid crystal lens and a geometric lens which are sequentially stacked;
   wherein the Fresnel liquid crystal lens comprises a first substrate, a first electrode, a liquid crystal layer, a second electrode and a second substrate which are stacked on top of one another;
   wherein the first electrode comprises:
      a plurality of first sub-electrodes spaced apart from each other and disposed on a surface of the first substrate close to the second substrate;
      a passivation layer disposed on the surface of the first substrate close to the second substrate and covering the plurality of first sub-electrodes; and
      a plurality of second sub-electrodes spaced apart from each other and disposed on a surface of the passivation layer close to the second substrate;
   wherein the plurality of first sub-electrodes and the plurality of second sub-electrodes have concentrically annular shapes, and orthogonal projections of the plurality of first sub-electrodes on the first substrate and orthogonal projections of the plurality of second sub-electrodes on the first substrate are arranged alternately;
   wherein each of widths $d_i$ of the first sub-electrode and the second sub-electrode is $d_i = \sqrt{i \cdot f \cdot \lambda} - \sqrt{(i-1) \cdot f \cdot \lambda}$, wherein i is an i-th first sub-electrode or an i-th second sub-electrode from an inside to an outside of the Fresnel liquid crystal lens, $\lambda$ is a wavelength, and f is a focal length of the Fresnel liquid crystal lens.

2. The lens according to claim 1, wherein the geometric lens is a lens, and wherein one of surfaces of the lens is a spherical surface.

3. The lens according to claim 2, wherein the geometric lens is a plano-convex lens or a plano-concave lens.

4. The lens according to claim 1, wherein there is no gap between an orthogonal projection of one of the plurality of first sub-electrodes on the first substrate and an orthogonal projection of an adjacent one of the plurality of second sub-electrodes on the first substrate.

5. The lens according to claim 1, wherein each annular band of the Fresnel liquid crystal lens comprises one to four of the plurality of first sub-electrodes and one to four of the plurality of second sub-electrodes.

6. The lens according to claim 1, wherein the geometric lens serves as the first substrate or the second substrate.

7. Glasses comprising the lens according to claim 1.

8. The glasses according to claim 7, wherein the geometric lens is a lens one of surfaces of the lens is a spherical surface.

9. The glasses according to claim 8, wherein the geometric lens is a plano-convex lens or a plano-concave lens.

10. The glasses according to claim 7, wherein there is no gap between an orthogonal projection of one of the plurality of first sub-electrodes on the first substrate and an orthogonal projection of an adjacent one of the plurality of second sub-electrodes on the first substrate.

11. The glasses according to claim 7, wherein each annular band of the Fresnel liquid crystal lens comprises one to four of the plurality of first sub-electrodes and one to four of the plurality of second sub-electrodes.

12. The glasses according to claim 7, wherein the geometric lens serves as the first substrate or the second substrate.

13. An optical system, comprising the lens according to claim 1.

14. A method for fabricating a lens, comprising:
   providing a Fresnel liquid crystal lens; and
   forming a geometric lens on a surface of the Fresnel liquid crystal lens;
   wherein providing a Fresnel liquid crystal lens comprises:
      forming a first electrode, a liquid crystal layer, a second electrode and a second substrate on a surface of a first substrate;
   wherein forming a first electrode comprises:
      forming, on a surface of the first substrate close to the second substrate, a plurality of first sub-electrodes that are spaced apart from each other;
      forming, on the surface of the first substrate close to the second substrate, a passivation layer that covers the plurality of first sub-electrodes; and forming, on a surface of the passivation layer close to the second substrate, a plurality of second sub-electrodes that are spaced apart from each other;

wherein the plurality of first sub-electrodes and the plurality of second sub-electrodes have concentrically annular shapes, and orthogonal projections of the plurality of first sub-electrodes on the first substrate and orthogonal projections of the plurality of second sub-electrodes on the first substrate are arranged alternately;

wherein each of widths $d_i$ of the first sub-electrode and the second sub-electrode is $d_i = \sqrt{i \cdot f \cdot \lambda} - \sqrt{(i-1) \cdot f \cdot \lambda}$, wherein i is an i-th first sub-electrode or an i-th second sub-electrode from an inside to an outside of the Fresnel liquid crystal lens, $\lambda$ is a wavelength, and f is a focal length of the Fresnel liquid crystal lens.

15. The method according to claim 14, wherein the geometric lens serves as the first substrate or the second substrate.

* * * * *